Figure 1:
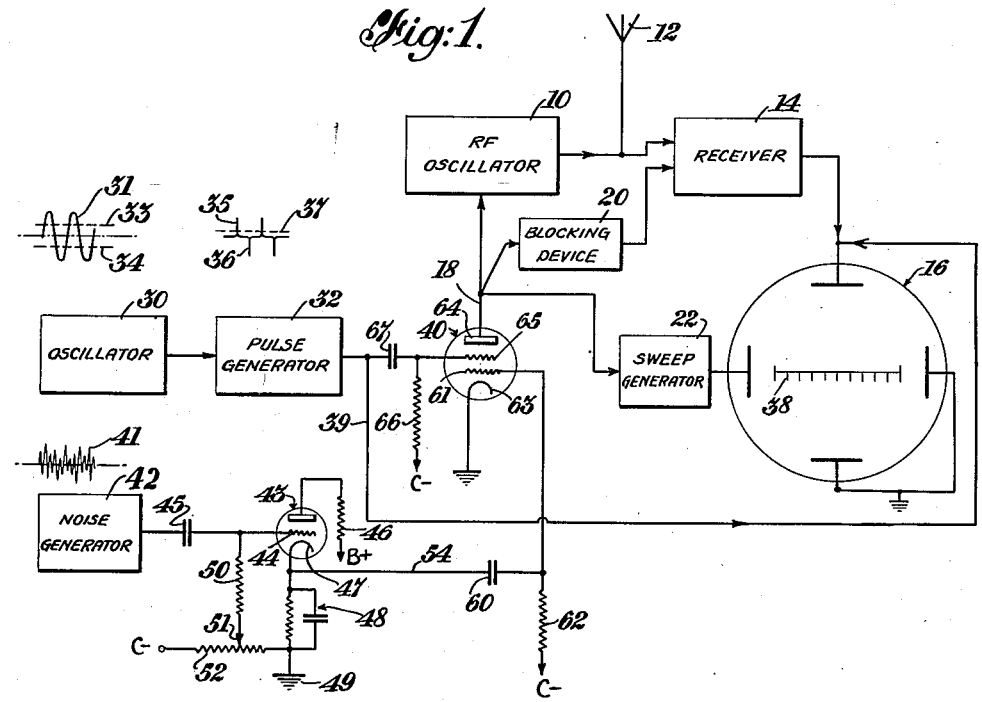

March 9, 1954    L. A. DE ROSA    2,671,896
RANDOM IMPULSE SYSTEM
Filed Dec. 18, 1942

INVENTOR.
LOUIS A. DeROSA
BY
*Percy P. Lantz*
ATTORNEY

Patented Mar. 9, 1954

2,671,896

UNITED STATES PATENT OFFICE 2,671,896

RANDOM IMPULSE SYSTEM

Louis A. de Rosa, Staten Island, N. Y., assignor to International Telephone and Telegraph Corporation, a corporation of Maryland Application December 18, 1942, Serial No. 469,419

21 Claims. (Cl. 343—17.1)

This invention relates to radio detection systems and more particularly to the generation of pulses for modulating, calibrating and other purposes.

In my copending application Serial No. 466,557, filed November 23, 1942, now U. S. Patent 2,438,-904, granted April 6, 1948, I show radio detection systems in which the transmission of impulses may occur either steadily or at random. One of the reasons for producing random transmission of impulses is to reduce the possibility of the enemy jamming the transmission of signals. If the transmission of impulses is steady or even varied according to some pattern, the enemy detecting the transmission of impulses can by transmission of impulses at the higher frequency used in the pattern jam the detection apparatus.

It is an object of my invention to provide a method and means to generate a series of pulses of random occurrence which when used for modulation of a carrier for transmission purposes, greatly minimizes the possibility of enemy jamming thereof.

Another object of the invention is to provide for the generation of a first series of pulses having very small displacement between successive pulses and using the series of pulses to determine the occurrence of a second series of pulses in which displacements between successive pulses thereof are equal to random multiples of the displacement of pulses of the first series.

Still another object of the invention is to provide for a radio detection system a first series of pulses of constant displacement suitable for calibration of an oscillograph of the system and to provide a second series of random pulses in coincidence with certain of the pulses of the first series and wherein the second series of pulses may be used for modulation of a carrier for transmission of impulses.

I generate the first series of pulses so that the pulses have a given small displacement between successive pulses. I then produce random pulses to comprise the second series with each random pulse in coincidence with one of the pulses of the first series. This synchronizing relationship of the first and second series of pulses and the method of rendering the second series of pulses random in occurrence may be accomplished by generating or otherwise obtaining a source of oscillations the amplitude of successive oscillations of which vary in a random fashion. These random oscillations are applied to the input of a vacuum tube which is biased to respond to the oscillations extending above a predetermined amplitude to effect passage of a pulsation of current. The biasing of the tube, however, is so arranged that the passage of a pulsation makes the tube so negatively biased that a predetermined time interval must pass before the tube returns to a biased condition which will respond to the random oscillations for passage of another pulsation of current. It will thus be clear that these pulsations will have random occurrence and, at the same time, will have a predetermined minimum displacement between successive pulsations. These pulsations together with pulses of the first series are introduced into a mixer tube which is biased so as to pass energy whenever a pulsation occurs in coincidence with one of the pulses of the series. It will be apparent that many of the pulsations will not occur in coincidence with the pulses of the first series and therefore a second random keying effect is accomplished. The random pulse energy passed by the mixer tube, however, has displacements between successive pulses equal to random multiples of the displacement between pulses of the first series so that the first series of pulses can be used as a source of calibration pulses for the oscillograph the sweep potential of which is triggered by the random pulses.

Figure 2:
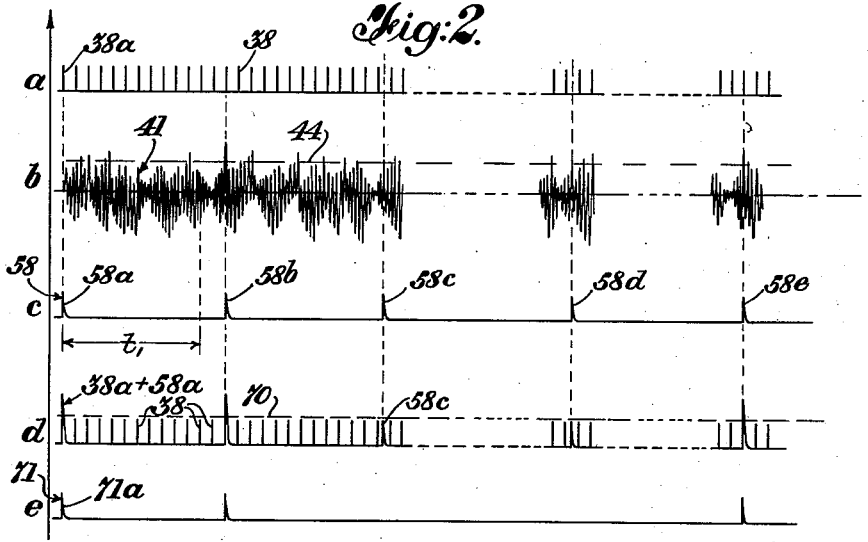

For a further understanding of the invention, reference may be had to the following detailed description to be read in connection with the accompanying drawings, in which:

Fig. 1 is a schematic illustration of a radio detection system constructed in accordance with my invention, and Fig. 2 is a graphical illustration of the pulse generating features of the invention.

Referring to Fig. 1, the radio detection system shown comprises a radio frequency oscillator 10 and an antenna 12 for transmission of impulses. A receiver 14 and a cathode ray oscillograph 16 are provided to receive and indicate echo pulses caused by obstacles in response to the transmitted impulses. Connecting a source 18 of modulating pulses for the radio frequency oscillator 10 is the usual blocking device 20 arranged to block the receiver during the transmission of impulses. Pulse energy from the source 18 is also supplied to a sweep generator 22 for control of the sweep potential for the oscillograph 16.

The source of calibration pulses is provided by a pulse generator comprising an oscillator 30 adapted to produce an undamped wave 31. The wave 31 is applied to a pulse generator 32 by which the wave is limit clipped along levels 33 and 34 and thereafter differentiated so as to provide alternately positive and negative pulses 35 and 36. The generator 32 may be provided with means for clipping the pulses so as to obtain a series of unidirectional pulses or the alternate positive and negative pulses 35 and 36 may be used directly to supply a mixer tube 40 and as a source of calibrating pulses for the oscillograph 16. For purposes of illustration, however, I prefer to clip the pulses along a level 37 so as to produce a series of unidirectional pulses 38 (curve a of Fig. 2). These unidirectional pulses may be applied to the deflection circuit of the oscillograph 16 over a connection 39.

The source of random pulses of the second series which I use for modulating purposes at the output connection 18 is produced by first obtaining a source of random oscillations 41. These oscillations may be produced in various ways. For example, an alternating current may be applied to a carbon or other resistor and the resistor noise produced thereby, when amplified, can be used. Another source of random oscillation may be obtained by using a simple receiver for pick-up of static and noise effect or for pick-up of specific signals.

The random oscillation output of such a noise generator 42 is used as a keying medium for a pulsation generating circuit having a tube 43 the grid 44 of which is connected to the output of the generator 42 through a coupling condenser 45. The anode of the tube 43 is biased with a positive potential through a resistor 46. The cathode 47 is self-biased by a resistor-condenser circuit 48 connected to ground at 49. The grid 44 is provided with a negative bias through a resistor 50 which is connected to an adjustable tap 51 on a potentiometer 52. One end of the potentiometer is grounded at 49 and the other end thereof is connected to a source of negative potential. The bias of the tube 43 may be selected by movement of the tap 51. The tube will then respond only to oscillations 41 exceeding the cut-off level of the selected bias.

When the tube is triggered to pass current between the anode and cathode, this passage of current provides an output pulsation at the lead 54 which is connected to the cathode 47. The self-biasing of the cathode by the circuit 48, however, is so chosen that the pulsation varies the cut-off of the tube so that succeeding pulsations 41 will not again trigger the tube for a time interval such as $t_1$ indicated on curve c of Fig. 2. When the cut-off condition of the tube returns to a level corresponding to about the normal biasing level 44, the tube will again be triggered upon application of a noise oscillation of an amplitude sufficient to overcome this cut-off bias. It will thus be apparent that the triggering of the tube 43 is limited by a minimum predetermined interval of time after each triggering operation and that succeeding triggering operations are keyed by the random noise oscillations. Thus, a supply of random pulsations 58 will occur as indicated by the curve c (Fig. 2).

These pulsations 58 are applied to a grid 61 of the mixer tube 40 through a coupling condenser 60. The grid 61 is biased negatively through a resistor 62. The cathode 63 is grounded and the anode 64 is connected to the output connection 18. A second grid 65 which is also biased negatively through a resistor 66 is connected through a coupling condenser 67 to the output of the pulse generator 32.

From the foregoing, it will be clear that a first series of pulses 38 having a given small displacement between the successive pulses thereof is applied to the mixer tube 40 through the medium of the grid 65. Random pulsations generated by the tube 43 are applied to the mixer tube through grid 61. The negative bias on the grids 61 and 65 produce a double valve effect in that each bias must be overcome simultaneously to effect conduction between the cathode and the anode of the tube.

As illustrated by the curves a, c and e of Fig. 2, a pulsation 58a is shown to coincide with a pulse 38a. This mixing and combination action results in conduction of a pulse 71a. The combination action is shown to occur for random pulsations 58a, 58b and 58e but not for pulsations 58c and 58d because the latter pulsations do not coincide with any of the pulses 38. Thus a series of random pulses 71 is produced at the anode connection 18 having displacements between the successive pulses equal to random multiples of the displacement between the pulses 38. While the pulses 71 have this synchronizing relationship with the pulses 38, it will be clear that they do not follow any given pattern. Further, since the pulses 71 are in coincidence with certain of the pulses 38, the latter may be used for calibration of the trace line of the oscillograph 16, the sweeps of which are controlled by the pulses 71.

The fact that the random pulses 71 do not follow any given pattern, greatly decreases the possibility of jamming. Further, while the random pulses 71 are based on displacements equal to random multiples of the displacement of the pulses 38, it will be understood that the latter displacement is chosen so fine that the possibility of jamming by transmission of pulses displaced according to the pulses 38 is also greatly minimized. Should the enemy attempt to transmit a pulse for each of the pulses 38 such transmission to be effective would require a great deal more power than the transmission of the random pulses 71.

While I have described the principles of my invention in connection with a specific embodiment, I recognize that many variations and modifications thereof are possible without departing from the invention. For example, a three electrode tube may be substituted for the mixer tube 40 and the pulses 38 and pulsations 58 supplied to a common grid. The mixing action then occurs substantially as indicated by the curve d of Fig. 2. The tube may be biased to effect a clipping action at a level 70 thereby passing energy only when the pulsations 58 are in coincidence with a pulse 38. It will be understood, therefore, that the specific embodiment herein shown and described is given by way of example only and not as limiting the scope of the invention as set forth in the objects thereof and the appended claims.

I claim:
1. A method of producing pulses of random occurrence comprising generating a series of pulses having a given displacement between successive pulses, generating random pulsations, mixing random pulsations with pulses of said series, and producing an output pulse each time a pulsation coincides with one of the pulses of said series.

2. The method defined in claim 1 wherein the generation of the random pulsations includes limiting the displacement between successive pulsations to a predetermined minimum time interval.

3. The method defined in claim 1 wherein the generation of the random pulsations comprises producing random noise oscillations and generating the random pulsations in response to said random noise oscillations.

4. A method of calibrating and controlling the sweep of an oscillograph having sweep and deflecting circuits, comprising generating a first series of pulses having a given displacement between successive pulses, generating a second series of pulses the displacements between the successive pulses of which are made equal to random multiples of said given displacement, applying the pulses of said second series to the sweep circuit of the oscillograph to control initiation of the sweeps and applying the pulses of the first series to the deflecting circuit of the oscillograph to calibrate the sweep line produced on the oscillograph.

5. The method defined in claim 4 wherein the generation of the second series of pulses comprises generating random pulsations, mixing the random pulsations with the pulses of the first series, and producing pulse energy in response to coincidence of a pulsation with a pulse of said first series.

6. A system for generating pulses of random occurrence comprising means to generate a series of pulses having a given displacement between successive pulses, means to generate random pulsations, means to mix the random pulsations with the pulses of said series, and means to produce pulse energy in response to coincidence of a pulsation with a pulse of said series.

7. The system defined in claim 6 wherein the means for generating the random pulsations includes means to limit the occurrence of said pulsations to a predetermined minimum time interval between successive pulsations.

8. The system defined in claim 6 wherein the means for generating the random pulsations includes a vacuum tube, a source of random oscillation, means to bias the tube to respond to oscillations exceeding a given amplitude to pass energy in the form of pulsations, and means to control the bias of the tube to block the passage of energy for a predetermined minimum time interval after the passage of each pulsation.

9. The system defined in claim 6 wherein the mixing means comprises a vacuum tube having two grids, means to apply the pulses of said series to one of said grids and means to apply the random pulsations to the other of said grids, and the means to produce pulse energy in response to coincidence of a pulsation with a pulse of said series includes means to bias each of the grids negatively.

10. A system for calibrating and controlling the sweep of an oscillograph having sweep and deflecting circuits, comprising means to generate a first series of pulses having a given displacement beween successive pulses, means to generate a second series of pulses the displacements between the successive pulses of which are equal to random multiples of said given displacement, means to apply the pulses of said second series to the sweep circuit of the oscillograph to control initiation of the sweep potential for the oscillograph, and means to apply the pulses of the first series to the deflecting circuit of the oscillograph to calibrate the sweep line produced on the screen of the oscillograph.

11. In a radio detection system having a radio frequency oscillator, a receiver and an oscillograph for the purposes of transmitting impulses and indicating echo pulses received in response to said impulses; the combination therewith of a pulse generator comprising means to generate a first series of pulses having a given displacement between successive pulses, a source of random oscillations, means keyable in response to the random oscillations to produce random pulsations, means including a vacuum tube to mix the pulsations with the pulses of the first series, means to bias said tube to pass energy in response to coincidence of a pulsation and a pulse of said first series, thereby producing a second series of pulses the displacements between successive pulses of which are equal to random multiples of said given displacement, means to apply the second series of pulses to the radio frequency oscillator for modulation purposes, a deflection circuit for said oscillograph, and means to apply the pulses of said first series to deflection circuit for calibration purposes.

12. A method of producing pulses of random occurrence comprising mixing a series of pulses having a given displacement between successive pulses with random pulsations and producing an output pulse each time a pulsation coincides with one of the pulses of said series.

13. A system for generating pulses of random occurrence wherein the displacement between any two successive pulses is equal to the multiple of a given time interval, comprising means to generate random pulsations with a minimum displacement between successive pulsations greater than a given number of said given time interval, means to mix said pulsations with a series of pulses having a displacement between successive pulses equal to said given time interval, and means to produce an output pulse each time a pulsation coincides with one of the pulses of said series.

14. In a radio detection system having means for transmitting impulses and receiver means for indicating echo pulses received in response to said impulses, a source of pulses having a given timing, a source of random pulsations, means to mix said pulses with said random pulsations to produce pulse energy in response to coincidence of a pulsation with one of said pulses and means to control the transmitting means with said pulse energy to produce random transmission of impulses.

15. A radio detection system according to claim 14 wherein said receiver means includes an oscillograph, a sweep circuit for said oscillograph, and means to control said sweep circuit according to the production of said pulse energy.

16. A radio detection system according to claim 14 wherein said receiver means includes an oscillograph having a sweep circuit and a deflection circuit, and means for applying said pulses to said deflection circuit for calibration indicating purposes.

17. In a radio detection system having means for transmitting impulses and receiver means for indicating echo pulses received in response to said impulses, means for producing a series of pulses having a given displacement between successive pulses, means for selecting at random pulses of said series, and means to control the transmitting means with the pulses thus selected to produce random transmission of impulses.

18. A radio detection system according to claim 17 wherein said receiver means includes an oscillograph having a sweep circuit and means to control said sweep circuit by means of the pulses selected at random from said series.

19. A radio detection system according to claim 17 wherein said receiver means includes an oscillograph having a sweep circuit and a deflection circuit and means for applying said series of pulses to said deflection circuit for calibration purposes.

20. A radio detection system according to claim 17 wherein said receiver means includes an oscillograph having a sweep circuit and a deflection circuit, means to control said sweep circuit by means of the pulses selected at random from said series, and means for applying said series of pulses to said deflection circuit for calibration purposes.

21. A system for producing pulses of random occurrence wherein the displacement between any two successive pulses is equal to the multiple of a given time interval, comprising means to generate a series of pulses separated according to said given timing interval, and means for selecting at random pulses of said series.

LOUIS A. DE ROSA.

No references cited.